United States Patent
Ding

(10) Patent No.: US 11,405,458 B2
(45) Date of Patent: Aug. 2, 2022

(54) SENDING AND RECEIVING DATA USING MULTIPLE OBJECTS WITH A SINGLE STORAGE REQUEST

(71) Applicant: Huawei Cloud Computing Technologies Co., Ltd., Guizhou (CN)

(72) Inventor: Jingwen Ding, Chengdu (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 0 days.

(21) Appl. No.: 17/158,815

(22) Filed: Jan. 26, 2021

(65) Prior Publication Data

US 2021/0160319 A1 May 27, 2021

Related U.S. Application Data

(63) Continuation of application No. PCT/CN2019/094112, filed on Jul. 1, 2019.

(30) Foreign Application Priority Data

Jul. 27, 2018 (CN) .................. 201810844624.X

(51) Int. Cl.
 *H04L 67/02* (2022.01)
 *H04L 67/1097* (2022.01)
 *H04L 67/06* (2022.01)

(52) U.S. Cl.
 CPC .......... *H04L 67/1097* (2013.01); *H04L 67/02* (2013.01); *H04L 67/06* (2013.01)

(58) Field of Classification Search
 CPC ...... H04L 67/1097; H04L 67/02; H04L 67/06
 See application file for complete search history.

(56) References Cited

U.S. PATENT DOCUMENTS

| | | | |
|---|---|---|---|
| 9,058,338 B2* | 6/2015 | Aslot | G06F 3/0673 |
| 9,912,752 B1* | 3/2018 | Davis | H04L 67/1097 |
| 10,810,157 B1* | 10/2020 | Paterra | G06F 3/0689 |
| 2006/0288047 A1* | 12/2006 | Chron | G06F 16/162 |
| 2014/0068340 A1* | 3/2014 | Dayal | G06F 11/3672 |
| | | | 714/38.1 |
| 2015/0063699 A1 | 3/2015 | Wu | |
| 2016/0057201 A1 | 2/2016 | Xu | |
| 2016/0299715 A1* | 10/2016 | Hashimoto | G06F 3/0652 |
| 2019/0045396 A1 | 2/2019 | Zhang | |

FOREIGN PATENT DOCUMENTS

| | | |
|---|---|---|
| CN | 101106550 A | 1/2008 |
| CN | 102262539 A | 11/2011 |
| CN | 105653209 A | 6/2016 |
| CN | 106686148 A | 5/2017 |
| CN | 107566463 A | 1/2018 |
| CN | 107911461 A | 4/2018 |
| CN | 109067733 A | 12/2018 |
| WO | 2017133234 A1 | 8/2017 |
| WO | 2017161050 A2 | 9/2017 |

* cited by examiner

*Primary Examiner* — Viet D Vu

(74) *Attorney, Agent, or Firm* — Conley Rose, P.C.

(57) ABSTRACT

A data transmitting method includes obtaining a plurality of first objects, where each of the first objects includes an amount of data that is less than or equal to a first data amount threshold, encapsulating the first objects to generate a second object, where the second object includes the first objects, and sending the second object to a server in an object storage system.

20 Claims, 6 Drawing Sheets

SENDING AND RECEIVING DATA USING MULTIPLE OBJECTS WITH A SINGLE STORAGE REQUEST

CROSS-REFERENCE TO RELATED APPLICATIONS

This application is a continuation of International Patent Application No. PCT/CN2019/094112 filed on Jul. 1, 2019, which claims priority to Chinese Patent Application No. 201810844624.X filed on Jul. 27, 2018. The disclosures of the aforementioned applications are hereby incorporated by reference in their entireties.

TECHNICAL FIELD

This disclosure relates to the storage field, and in particular, to a data sending method and apparatus, and a data receiving method and apparatus.

BACKGROUND

Simple Storage Service (S3) is an online storage service system that is provided by AMAZON. This resolves problems such as high construction and maintenance costs and low storage reliability that users face when building their own storage systems. The users can temporarily or permanently store any type of files on an S3 server using a service interface provided by AMAZON.

The S3 system uses three basic concepts: a bucket, an object, and a key. A bucket works like a folder and is used to store an object. An object is a basic storage unit of the S3 system, and includes data and metadata. The metadata is a special type of data used to describe the data included in the object. For ease of understanding, in the following, all "data" described in this disclosure does not include the metadata in the object unless otherwise specified. Metadata stores additional description information of data. The information may be system metadata defined by a system by default, or may be customized user metadata. The metadata usually coexists with data associated with the metadata, and does not exist alone. A key is an identifier (ID) of an object, and each object has only one key. A bucket, a key, and a version ID can uniquely identify one object.

Currently, a procedure of uploading data to the S3 server by the users is as follows.

A client establishes a connection with the S3 server, that is, an S3 connection, the client reads a locally stored object, and constructs an S3 request and sends the object to the S3 server using the Hypertext Transfer Protocol (HTTP).

Because a connection between the client and the S3 server can only serially process files, the connection is in an idle state most of time. Improving data uploading efficiency in the S3 system is useful.

SUMMARY

This disclosure provides a data sending method and apparatus. First, a plurality of to-be-uploaded objects with a comparatively small amount of data are encapsulated to generate an object with a comparatively large amount of data, that is, a large object, and then the large object is sent to an S3 server using a connection between a client and the S3 server. Because the plurality of small objects is uploaded as a whole (that is, the large object), in a process of uploading the plurality of small objects, there is no need to repeatedly send an S3 request. This improves data uploading efficiency in an S3 system.

According to a first aspect, a data sending method applied to an object storage system is provided, where the method includes obtaining a plurality of to-be-uploaded small objects, where each of the small objects is an object whose amount of data is less than or equal to a first data amount threshold, encapsulating the plurality of small objects to generate a large object, where the large object includes the plurality of small objects, sending an S3 request to a server, where the S3 request is used to request to upload the large object, receiving a response message for the S3 request from the server, where the response message is used to indicate to start to upload the large object, and sending the large object to the server.

The first aspect may be executed by a client. Because the plurality of small objects is uploaded as a whole (that is, the large object), in a process of uploading the plurality of small objects, the client does not need to repeatedly send the S3 request. This improves data uploading efficiency in an S3 system. In addition, because the client encapsulates the plurality of small objects for aggregation, and does not further process data in the small objects (for example, extract the data in the plurality of small objects for fusion processing), the first aspect further improves the uploading efficiency.

Optionally, encapsulating the plurality of small objects to generate a large object includes, when generation time points of the plurality of small objects fall within a preset time range, encapsulating the plurality of small objects to generate the large object.

The preset time range is, for example, 24 hours corresponding to one natural day. The plurality of small objects generated in the preset time range is encapsulated together and sent to the server, and this facilitates the server to manage the plurality of small objects, and improves efficiency of the server.

Optionally, encapsulating the plurality of small objects to generate a large object includes, when a total amount of data of the plurality of small objects after being encapsulated is less than or equal to a second data amount threshold, encapsulating the plurality of small objects to generate the large object.

In the first aspect, a case in which uploading fails because an amount of data of the large object is excessively large can be avoided.

Optionally, the large object further includes an object header, and the object header includes at least one piece of information of each small object in the plurality of small objects, including an object name, a generation time point, a message-digest algorithm 5 (MD5) value, a length, and an offset in the large object.

The foregoing information facilitates the server to manage the plurality of small objects by category, thereby improving the efficiency of the server.

Optionally, before sending an S3 request to a server, the method further includes establishing an HTTP connection to the server, where the HTTP connection is used to transmit the large object, and the HTTP connection is a persistent connection.

The persistent connection is a connection that is not immediately disconnected after an object is uploaded. After the large object has been uploaded, if there is a to-be-uploaded object subsequently, the client may directly send the S3 request, and there is no need to re-establish the HTTP connection. This reduces overheads for data uploading and improves the data uploading efficiency.

According to a second aspect, a data receiving method applied to an object storage system is provided, where the method includes receiving an S3 request from a client, where the S3 request is used to request to upload a large object, and the large object are encapsulated with a plurality of small objects, and each of the small objects is an object whose amount of data is less than or equal to a data amount threshold, sending a response message for the S3 request to the client, where the response message is used to indicate to start to upload the large object, and receiving the large object from the client.

The second aspect may be executed by a server. Because the plurality of small objects is uploaded as a whole (that is, the large object), in a process of receiving the plurality of small objects, the server does not need to repeatedly send the response message for the S3 request. This improves data uploading efficiency in an S3 system. In addition, because the client encapsulates the plurality of small objects for aggregation, and does not further process data in the small objects (for example, extract the data in the plurality of small objects for fusion processing), the second aspect further improves the uploading efficiency.

Optionally, the method further includes storing the plurality of small objects to a persistence layer of the object storage system, where storage spaces of the plurality of small objects are consecutive storage spaces, and storing metadata corresponding to each small object in the plurality of small objects to an index layer of the object storage system.

After receiving the plurality of small objects, the server stores the plurality of small objects in the consecutive storage spaces, and this facilitates management of the plurality of small objects.

Optionally, storing the plurality of small objects to a persistence layer of the object storage system includes storing, to the consecutive storage space at the persistence layer, a small object whose generation time point or upload time point falls within a preset time range in the plurality of small objects.

The preset time range is, for example, 24 hours corresponding to one natural day. The plurality of small objects generated in the preset time range are stored in the consecutive storage spaces, and this facilitates the server to manage the plurality of small objects, and improves efficiency of the server.

Optionally, the metadata is used to indicate the generation time point or the upload time point of the small object, and the method further includes scanning metadata of the plurality of small objects, and determining generation time points or upload time points of the plurality of small objects, and deleting a first small object when a generation time point or an upload time point of the first small object in the plurality of small objects falls within an expiration time range.

The first small object is any expired small object in the foregoing plurality of small objects, and the server may determine a generation time point or an upload time point of the small object by scanning metadata of the small object. When some small objects in the plurality of small objects are expired objects, the expired objects are deleted such that storage space utilization of the server can be improved.

Optionally, deleting a first small object when a generation time point or an upload time point of the first small object in the plurality of small objects falls within an expiration time range includes deleting the first small object when space utilization of the persistence layer is less than or equal to a space utilization threshold, and when the generation time point or the upload time point of the first small object in the plurality of small objects falls within the expiration time range.

The server may first add an expiration tag to the expired small object, and when the space utilization of the persistence layer is less than or equal to the space utilization threshold, delete the expired small object in order to provide better services for users when the storage space utilization of the server is improved.

Optionally, the large object further includes an object header, and the object header includes at least one piece of information of each small object in the plurality of small objects, including an object name, a generation time point, an MD5 value, a length, and an offset in the large object.

The server may manage the plurality of small objects by category based on the foregoing information such that the efficiency of the server is improved.

Optionally, before receiving an S3 request from a client, the method further includes establishing an HTTP connection to the server, where the HTTP connection is used to transmit the large object, and the HTTP connection is a persistent connection.

The persistent connection is a connection that is not immediately disconnected after an object is uploaded. After the large object has been uploaded, if there is a to-be-uploaded object subsequently, the client may directly send the S3 request, and there is no need to re-establish the HTTP connection. This reduces overheads for data uploading and improves the data uploading efficiency.

According to a third aspect, a data sending apparatus is provided, where the apparatus may implement functions corresponding to the steps in the method involved in the foregoing first aspect, and the functions may be implemented by hardware, or may be implemented by hardware executing corresponding software. The hardware or the software includes one or more units or modules corresponding to the foregoing functions.

In a possible design, the apparatus includes a processor, where the processor is configured to support the apparatus in executing the corresponding functions in the method involved in the foregoing first aspect. The apparatus may further include a memory, where the memory is configured to couple to the processor, and the memory stores a program instruction and data that are necessary to the apparatus. The apparatus further includes a communications interface, where the communications interface is configured to support communication between the apparatus and another network element.

According to a fourth aspect, a data receiving apparatus is provided, where the apparatus may implement functions corresponding to the steps in the method involved in the foregoing second aspect, and the functions may be implemented by hardware, or may be implemented by hardware executing corresponding software. The hardware or the software includes one or more units or modules corresponding to the foregoing functions.

In a possible design, the apparatus includes a processor, where the processor is configured to support the apparatus in executing the corresponding functions in the method involved in the foregoing second aspect. The apparatus may further include a memory, where the memory is configured to couple to the processor, and the memory stores a program instruction and data that are necessary to the apparatus. The apparatus further includes a communications interface, where the communications interface is configured to support communication between the apparatus and another network element.

According to a fifth aspect, a computer-readable storage medium is provided, where the computer-readable storage medium stores computer program code, and when the computer program code is executed by a processing unit or a processor, a data sending apparatus is enabled to perform the method in the first aspect.

According to a sixth aspect, a computer-readable storage medium is provided, where the computer-readable storage medium stores computer program code, and when the computer program code is executed by a processing unit or a processor, a data receiving apparatus is enabled to perform the method in the second aspect.

According to a seventh aspect, a chip is provided, and the chip stores an instruction, where when the instruction runs on a data sending apparatus, the chip is enabled to perform the method in the foregoing first aspect.

According to an eighth aspect, a chip is provided, and the chip stores an instruction, where when the instruction runs on a data receiving apparatus, the chip is enabled to perform the method in the foregoing second aspect.

According to a ninth aspect, a computer program product is provided, where the computer program product includes computer program code, and when the computer program code is executed by a processor or a processing unit of a data uploading apparatus, a data sending apparatus is enabled to perform the method in the foregoing first aspect.

According to a tenth aspect, a computer program product is provided, where the computer program product includes computer program code, and when the computer program code is executed by a processor or a processing unit of a data uploading apparatus, a data receiving apparatus is enabled to perform the method in the foregoing second aspect.

DESCRIPTION OF EMBODIMENTS

The following describes the technical solutions of this disclosure with reference to the accompanying drawings.

Figure 1:
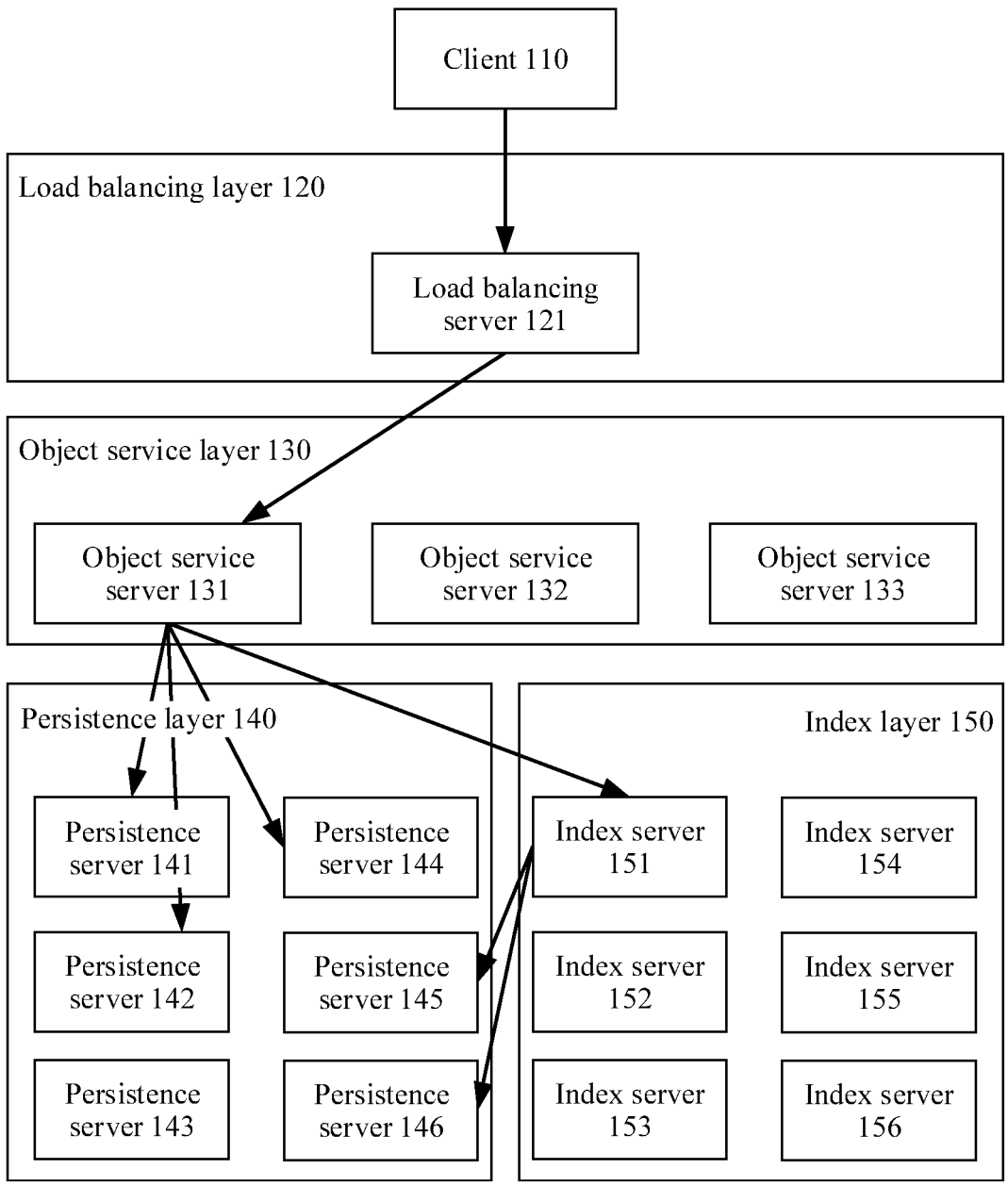
FIG. 1 is a schematic diagram of an object storage system applicable to this disclosure.

FIG. 1 is a schematic diagram of an object storage system applicable to this disclosure.

The object storage system includes a client 110 and a server. The server includes a load balancing layer 120, an object service layer 130, a persistence layer 140, and an index layer 150. The foregoing each layer includes one or more servers. For example, the load balancing layer 120 includes a load balancing server 121, and the object service layer includes an object service server 131, an object service server 132, and an object service server 133.

The persistence layer 140 is a clustered storage pool including a plurality of servers, and a plurality of hard disks are configured for each server to provide data persistence and redundancy protection capabilities. Hard disks on different servers at the persistence layer 140 are combined into a logically consecutive resource pool (plog), and both the object service layer 130 and the index layer 150 may read and write the plog.

The index layer 150 is configured to store metadata and provide an index capability.

When the client 110 needs to upload data, the client 110 sends an S3 request to the load balancing server 121 over an internal network or a public network. The S3 request indicates that the client 110 needs to write an object (that is, an object needs to be uploaded), or the S3 request indicates that the client 110 needs to read an object.

The load balancing server 121 may allocate the S3 request to one or more servers based on a load status of each server at the object service layer 130. For example, load of the object server 131 is currently comparatively light, and the load balancing server 121 allocates the S3 request to the object server 131.

If the S3 request indicates that the client 110 needs to write the object, after receiving the object, the object server 131 stores a part of data of the object to the persistence layer 140, and then stores metadata of the object to the index layer 150.

If the S3 request indicates that the client 110 needs to read the object, the object server 131 first searches the index layer 150 for metadata indicated by the S3 request, and then reads, from the persistence layer 140 based on a data layout recorded in the metadata, object data corresponding to the metadata.

A data sending method and a data receiving method that are based on the foregoing object storage system and that are provided in this disclosure are described in detail below.

Figure 2:
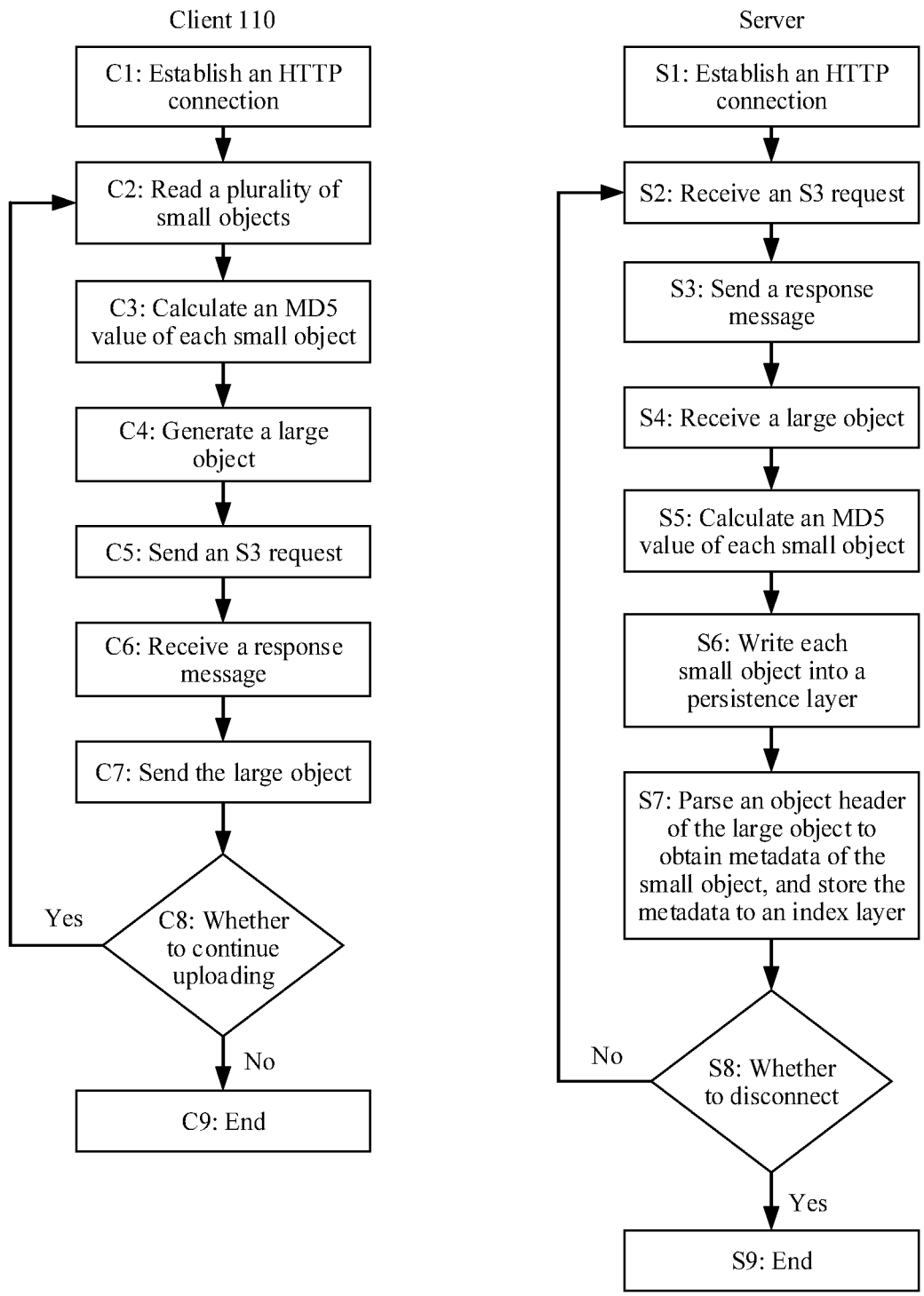
FIG. 2 is a schematic flowchart of a data uploading method based on an object storage system according to this disclosure.

As shown in FIG. 2, a procedure executed by the client 110 is as follows.

C1: Establish an HTTP connection to the server shown in FIG. 1. The HTTP connection is used to upload an object, and optionally, to reduce overheads for establishing a connection, the HTTP connection is a persistent connection. That is, after one object has been uploaded, the client 110 does not disconnect the HTTP connection, and continuously uses the HTTP connection to send an S3 request to request to upload another object.

C2: Read a plurality of small objects.

In this disclosure, the small object is an object whose amount of data is less than or equal to a first data amount threshold, and the first data amount threshold is, for example, 128 kilobytes (kB). If an obtained object is less than 128 kB, the client 110 determines that the object is the small object, and step C4 is performed: encapsulate the plurality of small objects into a large object and send the S3 request. If an obtained object is greater than 128 kB, the client 110 may directly send the S3 request to request to upload the object.

C3: Calculate a message-digest algorithm 5 (MD5) value of each small object, where the MD5 value is used by the server to check whether information included in the received small object is complete.

C4: Encapsulate, in the memory, the plurality of small objects into the large object. Optionally, the large object includes an object header, and the object header records an object name, a generation time point, an MD5 value, a length, and an offset that is of each small object in the large object.

As an optional example, before encapsulating N (N is a positive integer greater than 1) small objects, the client 110 first calculates an amount of data of the encapsulated large object. If the amount of data of the encapsulated large object exceeds a second data amount threshold, the client 110 may decrease a value of N. If the amount of data of the encapsulated large object does not exceed the second data amount threshold, the client 110 may continue to encapsulate the N small objects. The second data amount threshold may be a value set based on a bearer capability based on a connection.

Figure 3:
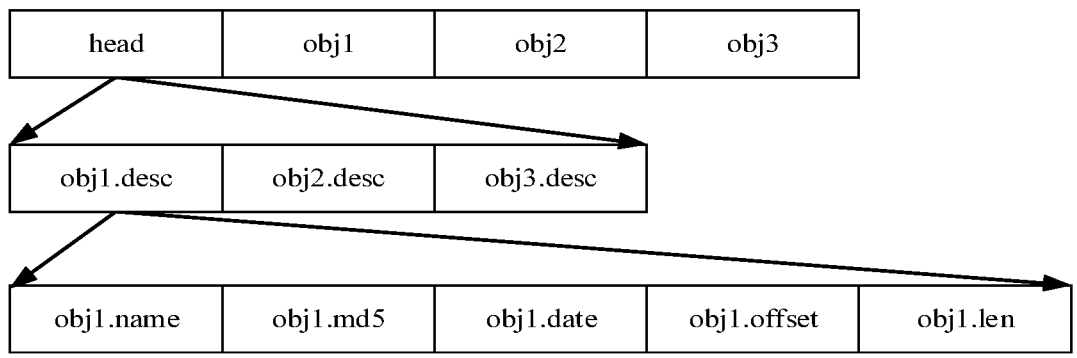
FIG. 3 is a schematic structural diagram of a large object according to this disclosure.

FIG. 3 is a schematic structural diagram of a large object generated by a client according to this disclosure.

The client 110 obtains three small objects that are respectively obj1, obj2, and obj3, and encapsulates the three small objects into one large object. An encapsulation format of the large object meets a transmission requirement of an HTTP connection. In addition to obj1, obj2, and obj3, the large object further includes an object header, and the object header includes description information of each small object, that is, obj1.desc, obj2.desc, and obj3.desc. For example, the description information of obj1 includes a path name (obj1.name) of obj1, an MD5 value (obj1.md5) of obj1, a generation date (obj1.date) of obj1, a length of obj1 (obj1.length), and an offset of obj1 (obj1.offset) relative to the object header in the large object.

The schematic structural diagram of the large object is an example for description. The encapsulation format of the large object may alternatively be another format that meets a transmission requirement of a connection between the client 110 and a server, and the object header may further include more types of information or fewer types of information.

In this disclosure, the client 110 encapsulates, in a memory, a plurality of small objects without changing data structures of the plurality of small objects or performing encryption processing or another processing on the plurality of small objects, and only encapsulates the plurality of small objects into a data packet that meets the transmission requirement of the connection between the client 110 and the server. This not only improves uploading efficiency of the client 110, but also facilitates the server to obtain the plurality of small objects from the large object.

C5: Send the S3 request to the server to request to upload the large object.

C6: Receive a response message for the S3 request from the server, where the response message indicates that the client 110 starts to upload the large object.

C7: Send the large object to the server based on the response message.

C8: After the large object has been uploaded, if the client 110 still has a to-be-uploaded object, the client 110 continues to perform the step C2, and if the client 110 does not have the to-be-uploaded object, the client 110 performs step C9.

C9: Disconnect the HTTP connection. The procedure ends.

The foregoing procedure demonstrates that the client 110 aggregates the plurality of small objects into one large object, and then sends the large object to the server. The client 110 can upload the plurality of small objects to the server by sending the S3 request for only once. Compared with other approaches in which a client needs to send an S3 request every time when sending a small object, the foregoing procedure provided in this disclosure reduces information overheads, and improves data uploading efficiency in an object storage system.

A procedure executed by the server is as follows.

S1: Establish an HTTP connection to the client 110. The HTTP connection is used to upload an object, and optionally, to reduce overheads for establishing a connection, the HTTP connection is a persistent connection. That is, after one object has been uploaded, the server does not disconnect the HTTP connection, and continuously uses the HTTP connection to receive an S3 request, and receive another object uploaded by the client 110.

S2: Receive the S3 request, where the S3 request is used to request to upload a large object.

S3: Send a response message to the client 110, where the response message indicates that the client 110 starts to upload the large object.

S4: Receive the large object from the client 110.

S5: Check data integrity of a small object. For example, a location of each small object in the large object is determined based on description information in an object header, and an MD5 value of each small object is calculated. If a check of the MD5 value succeeds, it indicates that data of the small object is complete, and if the check of the MD5 value fails, the data of the small object is incomplete.

S6: Write a plurality of small objects into a persistence layer. Optionally, the plurality of small objects is written into the plog of the persistence layer 140, that is, data of the plurality of small objects is written into consecutive storage spaces.

A plurality of small objects belonging to one large object are usually associated to some extent, for example, the plurality of small objects has a same generation time point. The plurality of small objects belonging to one large object are written into the consecutive storage spaces to facilitate management of the server.

Optionally, the server reads metadata of each small object, determines a generation time point or an upload time point of each small object, and stores, in the consecutive storage spaces, small objects whose generation time point or upload time point falls within a same time range, where the time range may be a preset range.

The foregoing is one example for description. The server may also classify the received plurality of small objects in another manner, and store a same type of small objects in the consecutive storage spaces.

S7: Parse the object header of the large object to obtain the metadata of the small object, and store the metadata to the index layer 150.

Figure 4:
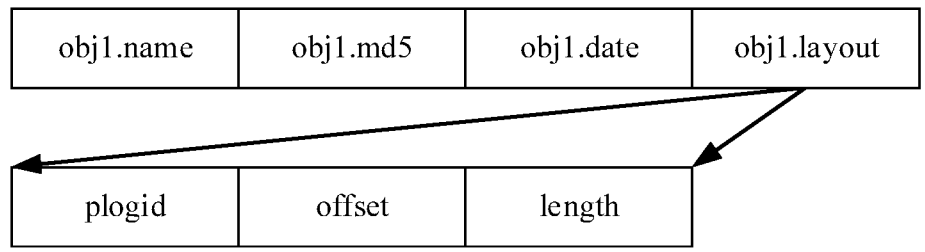
FIG. 4 is a schematic structural diagram of metadata according to this disclosure.

FIG. 4 is a schematic structural diagram of metadata stored at a server according to this disclosure.

obj1 is used as an example. After obtaining metadata of obj1 by parsing a received large object, the server writes layout information (obj1.layout) of obj1 at the server into the metadata, and deletes some useless information, for example, obj1.offset and obj1.len.

obj1.layout includes an identifier (plogid) of a plog storing obj1, an offset of obj1 relative to a start position of the plog, and a data length of obj1. The data length of obj1 is used to indicate a quantity of bits occupied by obj1.

The schematic structural diagram of the metadata shown in FIG. 4 is one example for description. The server may further add more description information to metadata of a small object.

S8: After the large object has been uploaded, if the client 110 still has a to-be-uploaded object, the server continues to perform the step S2, and if the client 110 does not have the to-be-uploaded object, the server performs step S9.

S9: Disconnect the HTTP connection. The procedure ends.

The foregoing procedure demonstrates that the server receives, by receiving the large object including the plurality of small objects, the plurality of small objects by receiving the S3 request for only once. Compared with other approaches in which the server needs to receive the S3 request for once every time when receiving one small object, the foregoing procedure provided in this disclosure reduces information overheads, and improves data uploading efficiency in an object storage system.

To improve requirements of input/output (I/O) performance, the server needs to align data when storing the data. For example, a minimum storage unit at the server is 128 kB. If the server receives only one 80 kB small object, the small object occupies a 128 kB storage space. This leads to a waste of storage resources. In addition, to improve a requirement of reliability, the server usually needs to back up one piece of data to obtain a plurality of copies and store copies in different disks. For example, if one 80 kB small object is backed up to obtain three copies, the foregoing storage resources are wasted by three times more.

According to the method shown in FIG. 2, the large object received by the server is a set of the plurality of small objects. For example, if the server receives three 80 kB small objects, the three 80 kB small objects need only two 128 kB storage spaces, however, in the other approaches, three 128 kB storage spaces are required to store three 80 kB small objects. Therefore, according to the data uploading method provided in this disclosure, storage resource utilization at the server can be improved.

In a process of storing a small object, the server may regularly or irregularly scan metadata of the small object to obtain a generation time point or an upload time point of the small object. If the generation time point or the upload time point of the small object falls within an expiration time range, the server may directly delete the expired small object to improve space utilization of the plog, or may add an expired label to the metadata of the expired small object. When the space utilization of the plog is less than a preset utilization threshold, a space reclamation process is started, that is, the small object corresponding to the metadata that carries the expired label is deleted. In this way, space utilization can be improved, while a better service can be provided for users.

Because the server stores, in the consecutive storage spaces according to the method shown in FIG. 2, the small objects whose generation time points or upload time points fall within a same time range, when a time range becomes the expiration time range, the server may delete all small objects corresponding to the time range, and obtain the consecutive storage spaces. Therefore, space fragments are avoided, the storage resource utilization at the server is improved, and lifecycle management overheads for a small object are reduced.

Figure 5:
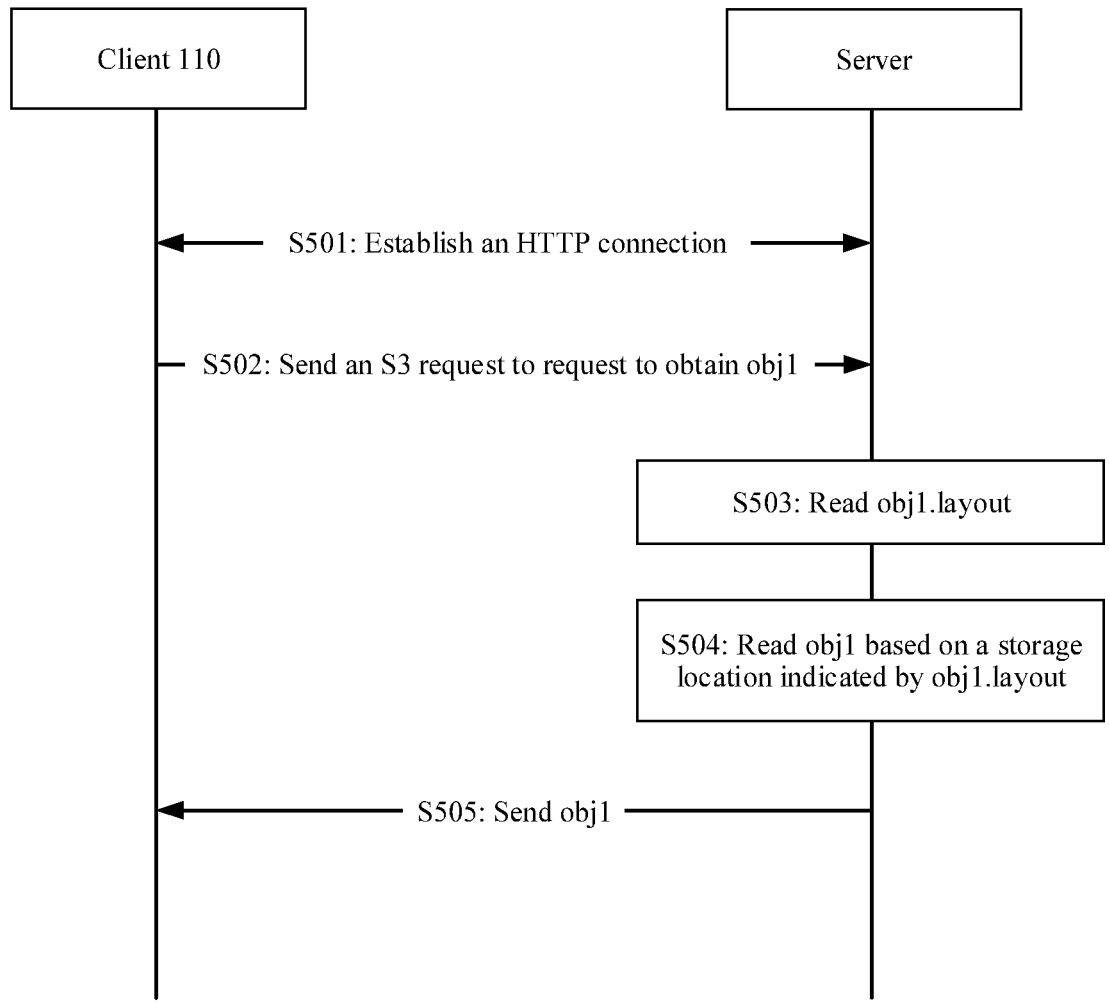
FIG. 5 is a schematic flowchart of a data downloading method based on an object storage system according to this disclosure.

This disclosure further provides a data downloading method. As shown in FIG. 5, the method includes the following steps.

S501: When a client 110 needs to download a small object, the client 110 establishes an HTTP connection to a server.

S502: The client 110 sends an S3 request to the server, where the S3 request is used to request to obtain the small object, and the small object is, for example, obj1.

S503: After receiving the S3 request, the server reads metadata of obj1 based on information (for example, a name of a bucket, a name of obj1, and path information of obj1) carried in the S3 request, and obtains layout information (obj1.layout) of obj1 to obtain a storage location of obj1.

S504: The server reads, based on the storage location indicated by obj1.layout, obj1 from a plog corresponding to obj1.

S505: The server sends obj1 to the client 110 in order to complete a data downloading process.

An example of the data sending method and an example of the data receiving method that are provided in this disclosure are described in detail above. It may be understood that to implement the foregoing functions, a data sending apparatus and a data receiving apparatus include corresponding hardware structures and/or software modules for executing the functions. A person of ordinary skill in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular disclosure, but it should not be considered that the implementation goes beyond the scope of this disclosure.

In this disclosure, the data sending apparatus and the data receiving apparatus may be divided into functional units based on the foregoing method examples. For example, each function may be divided into each functional unit, or two or more functions may be integrated into one processing unit. The integrated unit may be implemented in a form of hardware, or may be implemented in a form of a software functional unit. It should be noted that, in this disclosure, unit division is an example, and may be a logical function division. In an actual implementation, another division manner may be used.

Figure 6:
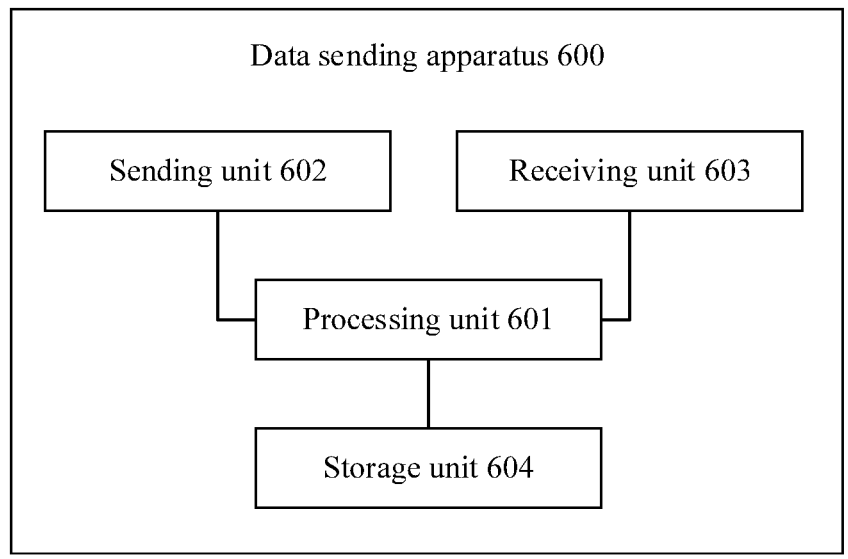
FIG. 6 is a schematic structural diagram of a data sending apparatus according to this disclosure.

When an integrated unit is used, FIG. 6 is a possible schematic structural diagram of a data sending apparatus according to this disclosure. The apparatus 600 includes a processing unit 601, a sending unit 602, and a receiving unit 603. The processing unit 601 is configured to control the apparatus 600 to perform the steps of the client shown in FIG. 2. The processing unit 601 may be further configured to perform another process of the technology described in this specification. The apparatus 600 may further include a storage unit 604 that is configured to store program code and data of the apparatus 600.

For example, the processing unit 601 is configured to obtain a plurality of to-be-uploaded small objects, where each of the small objects is an object whose amount of data is less than or equal to a first data amount threshold, and encapsulate the plurality of small objects to generate a large object, where the large object includes the plurality of small objects.

The sending unit 602 is configured to send an S3 request to a server, where the S3 request is used to request to upload the large object.

The receiving unit 603 is configured to receive a response message for the S3 request from the server, where the response message is used to indicate to start to upload the large object.

The sending unit 602 is further configured to send the large object to the server.

The processing unit 601 may be a processor or a controller, such as a central processing unit (CPU), a general purpose processor, a digital signal processor (DSP), an application-specific integrated circuit (ASIC), a field-programmable gate array (FPGA), or another programmable logic device, a transistor logic device, a hardware component, or any combination thereof. The processor may implement or execute various example logical blocks, modules, and circuits described with reference to content disclosed in this disclosure. The processor may also be a combination of processors implementing a computing function, for example, a combination of one or more microprocessors, or a combination of the DSP and the microprocessor. The sending unit 602 and the receiving unit 603 may be communications interfaces. The storage unit 604 may be a memory.

Figure 7:
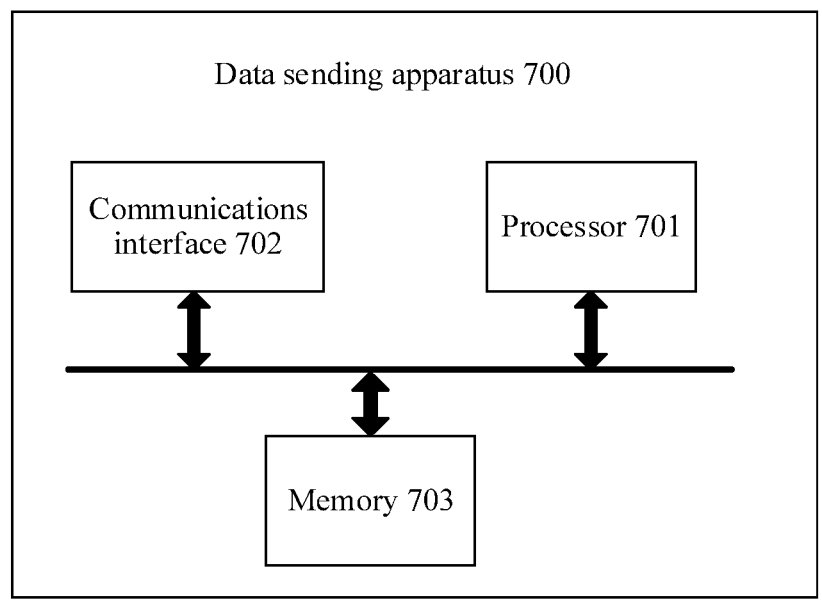
FIG. 7 is a schematic structural diagram of another data sending apparatus according to this disclosure.

When the processing unit 601 is the processor, the sending unit 602 and the receiving unit 603 are the communications interfaces, and the storage unit 604 is the memory, the data sending apparatus involved in this disclosure may be an apparatus shown in FIG. 7.

Referring to FIG. 7, the apparatus 700 includes a processor 701, a communications interface 702, and a memory 703. The processor 701, the communications interface 702, and the memory 703 may communicate with each other using an internal connection path, to transfer a control signal and/or a data signal.

It may be clearly understood by a person of skill in the art that, for ease and brief description, for a detailed working process of the foregoing apparatus and units, refer to a corresponding process in the foregoing method embodiments, and details are not described herein again.

The data sending apparatus provided in this disclosure first encapsulates the plurality of to-be-uploaded objects with a comparatively small amount of data to generate an object with a comparatively large amount of data, that is, the large object, and then, sends the large object to the S3 server using a connection between a client and the S3 server. Because the plurality of small objects is uploaded as a whole (that is, the large object), in a process of uploading the plurality of small objects, there is no need to repeatedly send the S3 request. This improves data uploading efficiency in an S3 system.

Figure 8:
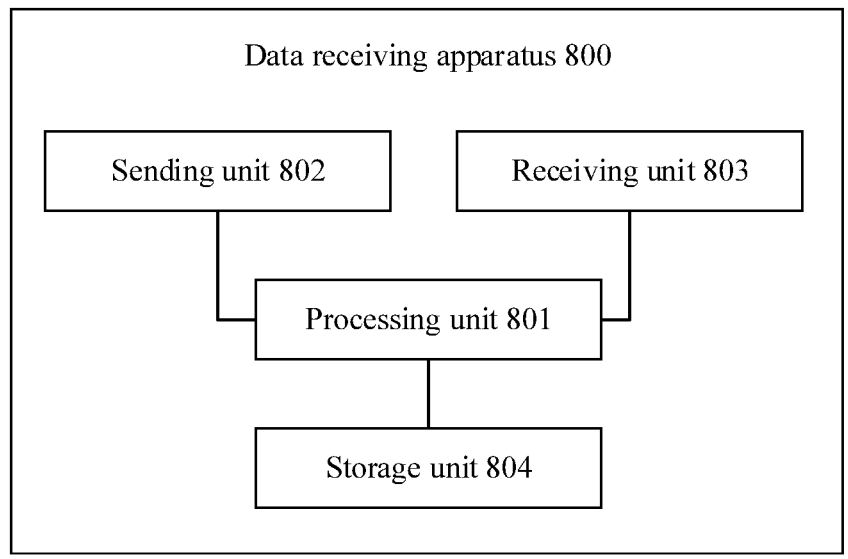
FIG. 8 is a schematic structural diagram of a data receiving apparatus according to this disclosure.

When an integrated unit is used, FIG. 8 is a possible schematic structural diagram of a data receiving apparatus according to this disclosure. The apparatus 800 includes a processing unit 801, a sending unit 802, and a receiving unit 803. The processing unit 801 is configured to control the apparatus 800 to perform the steps of the server shown in FIG. 2. The processing unit 801 may be further configured to perform another process of the technology described in this specification. The apparatus 800 may further include a storage unit 804 that is configured to store program code and data of the apparatus 800.

For example, the processing unit 801 is configured to control the receiving unit 803 to receive an S3 request from a client, where the S3 request is used to request to upload a large object, and the large object includes a plurality of small objects, and each of the small objects is an object whose amount of data is less than or equal to a data amount threshold.

The processing unit 801 is configured to control the sending unit 802 to send a response message for the S3 request to the client, where the response message is used to indicate to start to upload the large object.

The processing unit 801 is further configured to control the receiving unit 803 to receive the large object from the client.

The processing unit 801 may be a processor or a controller, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this disclosure. The processor may also be a combination of processors implementing a computing function, for example, a combination of one or more microprocessors, or a combination of the DSP and the microprocessor. The sending unit 802 and the receiving unit 803 may be communications interfaces. The storage unit 804 may be a memory.

Figure 9:
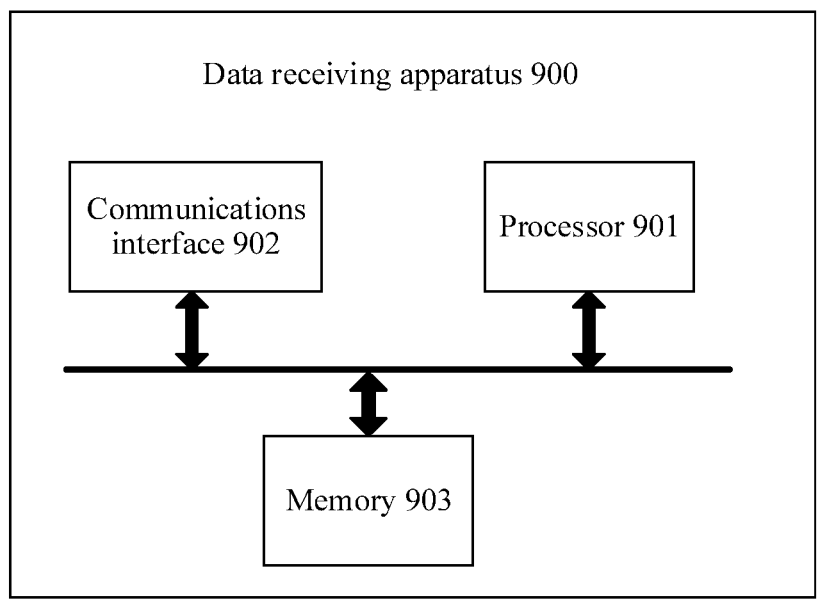
FIG. 9 is a schematic structural diagram of another data receiving apparatus according to this disclosure.

When the processing unit 801 is the processor, the sending unit 802 and the receiving unit 803 are the communications interfaces, and the storage unit 804 is the memory, the data receiving apparatus involved in this disclosure may be an apparatus shown in FIG. 9.

Referring to FIG. 9, the apparatus 900 includes a processor 901, a communications interface 902, and a memory 903. The processor 901, the communications interface 902, and the memory 903 may communicate with each other using an internal connection path, to transfer a control signal and/or a data signal.

It may be clearly understood by a person of skill in the art that, for ease and brief description, for a detailed working process of the foregoing apparatus and units, refer to a corresponding process in the foregoing method embodiments, and details are not described herein again.

The data receiving apparatus provided in this disclosure, by receiving the large object including the plurality of small objects, receives the plurality of small objects by receiving the S3 request for only once. Compared with other approaches in which the server needs to receive the S3 request for once every time when receiving one small object, the foregoing procedure provided in this disclosure reduces information overheads, and improves data uploading efficiency in an object storage system.

An apparatus embodiment completely corresponds to a method embodiment, and a corresponding module performs a corresponding step. For example, a sending unit performs a sending step in the method embodiment, a receiving unit performs a receiving step in the method embodiment, and another step other than the sending step and the receiving step may be performed by a processing unit or a processor. For a function of a specific unit, refer to a corresponding method embodiment. Details are not described herein again.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of this disclosure.

In addition, the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Method or algorithm steps described in combination with the content disclosed in this disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a register, a hard disk, a removable hard disk, a compact disc (CD) ROM (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in an ASIC.

The objectives, technical solutions, and benefits of this disclosure are further described in detail in the foregoing specific embodiments. It should be understood that the foregoing descriptions include various exemplary embodiments of this disclosure, but are not intended to limit the protection scope of this disclosure. Any modification, equivalent replacement or improvement made based on technical solutions of this disclosure shall fall within the protection scope of this disclosure.

What is claimed is:

1. A method comprising:
receiving, from a client, a second object comprising a plurality of first objects and a single object header corresponding to the first objects, wherein each of the first objects comprises a first amount of data to be uploaded to a server in an object storage system, wherein the object header comprises an object description for each of the first objects, an offset in the second object relative to the object header for each of the first objects, and a message-digest algorithm 5 (MD5) value, wherein the MD5 value for each of the first objects comprises a value calculated based on applying an MD5 algorithm to the data of each of the first objects, wherein each of the first objects comprises the first amount of data that is less than or equal to a first data amount threshold, wherein the second object comprises a total amount of data that is less than or equal to a second data amount threshold, and wherein the first objects and the second object are only associated with a single storage request;
deleting the offset in the second object relative to the object header for each of the first objects and a length in the second object for each of the first objects; and
storing, after deleting the offset in the second object, the second object in the object storage system.

2. The method of claim 1, further comprising:
storing the first objects into consecutive storage spaces in a persistence layer of the object storage system; and
storing first metadata corresponding to each of the first objects into an index layer of the object storage system.

3. The method of claim 2, further comprising further storing, into the consecutive storage spaces at the persistence layer, a third object whose generation time point or upload time point falls within a preset time range in the first objects, wherein the first objects comprise the third object.

4. The method of claim 3, wherein second metadata of the third object indicates the generation time point or the upload time point, and wherein the method further comprises:
scanning the first metadata;
determining a second generation time point or a second upload time point of a fourth object; and
deleting the fourth object when the second generation time point or the second upload time point falls within an expiration time range.

5. The method of claim 4, further comprising further deleting the fourth object when a space utilization of the persistence layer is less than or equal to a space utilization threshold.

6. The method of claim 1, wherein the object header further comprises an object name, a generation time point, and a length for each of the first objects.

7. A server in an object storage system, the server comprising:
an interface; and
a processor coupled to the interface and configured to:
receive, using the interface, a second object from a client, wherein the second object comprises a plurality of first objects and a single object header corresponding to the first objects, wherein each of the first objects comprises a first amount of data to be uploaded to the server, wherein the object header comprises an object description for each of the first objects, an offset in the second object relative to the object header for each of the first objects, and a message-digest algorithm 5 (MD5) value, wherein the MD5 value for each of the first objects comprises a value calculated based on applying an MD5 algorithm to the data of each of the first objects, wherein each of the first objects comprises the first amount of data that is less than or equal to a first data amount threshold, wherein the second object comprises a total amount of data that is less than or equal to a second data amount threshold, and wherein the first objects and the second object are only associated with a single storage request;
delete the offset in the second object relative to the object header for each of the first objects in a length of the second object for each of the first objects; and
store, after deleting the offset in the second object, the second object in the object storage system.

8. The server of claim 7, wherein the processor is further configured to:
store the first objects into consecutive storage spaces in a persistence layer of the object storage system; and
store first metadata corresponding to each of the first objects into an index layer of the object storage system.

9. The server of claim 8, wherein the processor is further configured to store, into the consecutive storage spaces at the persistence layer, a third object whose generation time point or upload time point falls within a preset time range in the first objects, and wherein the first objects comprise the third object.

10. The server of claim 9, wherein second metadata indicates the generation time point or the upload time point, and wherein the processor is further configured to:
scan the first metadata;
determine a second generation time point or a second upload time point of a fourth object; and
delete the fourth object when the second generation time point or the second upload time point falls within an expiration time range.

11. The server of claim 10, wherein the processor is further configured to delete the fourth object when a space utilization of the persistence layer is less than or equal to a space utilization threshold.

12. The method of claim 1, wherein generation time points of the first objects fall within a preset time range.

13. The method of claim 1, further comprising establishing a Hypertext Transfer Protocol (HTTP) connection for receiving the second object from the client, wherein the HTTP connection is a persistent connection.

14. The server of claim 7, wherein generation time points of the first objects fall within a preset time range.

15. The server of claim 7, wherein the processor is further configured to establish a Hypertext Transfer Protocol (HTTP) connection to receive the second object from the client, and wherein the HTTP connection is a persistent connection.

16. A computer program product comprising computer-executable instructions stored on a non-transitory computer-readable medium that, when executed by a processor, cause a server in an object storage system to:
receive, from a client, a second object comprising a plurality of first objects and a single object header corresponding to the first objects, wherein each of the first objects comprises a first amount of data to be uploaded to the server, wherein the object header comprises an object description for each of the first objects, an offset in the second object relative to the object header for each of the first objects, and a message-digest algorithm 5 (MD5) value, wherein the MD5 value for each of the first objects comprises a value calculated based on applying an MD5 algorithm to the data of each of the first objects, wherein each of the first objects comprises the first amount of data that is less than or equal to a first data amount threshold, wherein the second object comprises a total amount of data that is less than or equal to a second data amount threshold, and wherein the first objects and the second object are only associated with a single storage request;
delete the offset in the second object relative to the object header for each of the first objects and a length in the second object for each of the first objects; and
store, after deleting the offset in the second object, the second object in the object storage system.

17. The computer program product of claim 16, wherein the instructions further cause the server to:
store the first objects into consecutive storage spaces in a persistence layer of the object storage system; and
store first metadata corresponding to each of the first objects into an index layer of the object storage system.

18. The computer program product of claim 16, wherein the instructions further cause the server to store, into the consecutive storage spaces at the persistence layer, a third object whose generation time point or upload time point falls within a preset time range in the first objects, and wherein the first objects comprise the third object.

19. The computer program product of claim 18, wherein second metadata of the third object indicates the generation time point or the upload time point, and wherein the instructions further cause the server to:
scan the first metadata;
determine a second generation time point or a second upload time point of a fourth object; and
delete the fourth object when the second generation time point or the second upload time point falls within an expiration time range.

20. The computer program product of claim 19, wherein the instructions further cause the server to delete the fourth object when a space utilization of the persistence layer is less than or equal to a space utilization threshold.

* * * * *